(12) United States Patent
Alneaimi (10) Patent No.: US 9,126,548 B1
(45) Date of Patent: Sep. 8, 2015

(54) PUSH BUTTON ACTUATED TOILET FOR MOTOR VEHICLE

(71) Applicant: Abeer E. M. Alneaimi, Kuwait (KW)

(72) Inventor: Abeer E. M. Alneaimi, Kuwait (KW)

( * ) Notice: Subject to any disclaimer, the term of this patent is extended or adjusted under 35 U.S.C. 154(b) by 0 days.

(21) Appl. No.: 14/536,728

(22) Filed: Nov. 10, 2014

(51) Int. Cl.
  *B60R 15/04* (2006.01)
  *A47K 11/02* (2006.01)
  *A47K 17/00* (2006.01)
  *E03D 9/08* (2006.01)

(52) U.S. Cl.
  CPC .............. *B60R 15/04* (2013.01); *A47K 11/02* (2013.01); *A47K 17/00* (2013.01); *E03D 9/08* (2013.01)

(58) Field of Classification Search
  CPC ................................ B60R 15/04; A47K 11/04
  USPC .................................. 296/146.7; 4/458, 480
  See application file for complete search history.

(56) References Cited

U.S. PATENT DOCUMENTS

| | | | |
|---|---|---|---|
| 3,925,827 A | 12/1975 | Wagenhals | |
| 4,785,483 A | 11/1988 | Wise | |
| 5,359,737 A | 11/1994 | Hodge | |
| 6,000,067 A * | 12/1999 | Cascia | 4/223 |
| 6,491,085 B1 * | 12/2002 | Anthony et al. | 160/168.1 V |
| 7,313,833 B2 | 1/2008 | Wee | |
| 8,365,317 B1 | 2/2013 | Dorra | |
| 2006/0037130 A1 * | 2/2006 | Graham | 4/480 |
| 2008/0023983 A1 * | 1/2008 | Reed et al. | 296/146.7 |
| 2010/0235978 A1 * | 9/2010 | Guttau et al. | 4/420.4 |

* cited by examiner

*Primary Examiner* — Janie Christiansen
(74) *Attorney, Agent, or Firm* — Lowe Hauptman & Ham, LLP (57) ABSTRACT

A motor vehicle such as an automobile includes a passenger seat and toilet system that includes a metal frame, a seat portion, a seat back and console adjacent to and slightly above the seat portion with a plurality of switches disposed in the console for activating a toilet system. The toilet system includes a privacy curtain and track way extendable around the seat and is integral with the passenger seat. The toilet system includes a toilet bowl, a waste disposal opening in a bottom portion thereof and is activatable by a number of push button switches. The system includes a remote water tank separate from the vehicle cooling system and an electric pump and hose for connecting the water tank to a nozzle for spraying water onto the toilet bowl and individuals sitting on the toilet. The system also includes a waste disposal drawer, a container positioned below the toilet bowl for receiving waste and a heavy duty plastic bag with a closure cord for receiving the waste and water.

4 Claims, 8 Drawing Sheets

PUSH BUTTON ACTUATED TOILET FOR MOTOR VEHICLE

FIELD OF THE INVENTION

This invention relates to a push button activatable integral passenger seat and toilet system for a motor vehicle and more particularly to a land vehicle such as a passenger car, utility vehicle or the like.

BACKGROUND OF THE INVENTION

Toilet systems disposed in a motor vehicle have been known for many years since at least as early as 1975 and have taken various forms. A somewhat more recent development is disclosed in a U.S. Pat. No. 4,785,483 issued to Paul H. Wise that defines an integrated passenger seat and toilet apparatus and method. As disclosed, the apparatus includes a structural seat, an integrated toilet, a water supply, a waste system and a swivel mechanism. The method includes modifying the vehicle, supplying the apparatus, installing the apparatus and using the apparatus. The passenger seat rotates to lockable positions for use in multiple orientations. A segmented seat cushion is hingeably attached to a structural seat member and molded to provide a seal with the toilet seat below. Water is pumped from a reservoir through a flexible hose to a ported water rinse ring in the toilet. Wastes are released through a flapper mechanism into a holding tank sanitarily sealed to the toilet. A privacy curtain is also provided.

A U.S. Patent of Karen Wee, U.S. Pat. No. 7,313,833 discloses a vehicle emergency toilet system. The system has portions built into the seat of a vehicle. The toilet equipped vehicle having a toilet with a disposable waste receiving reservoir together with deployable privacy shades built into the vehicle seat back, vehicle roof or rear deck. The emergency toilet may be built into any mode of transportation such as a helicopter, a jet plane, a military helicopter, a submarine, an automobile, an ambulance, a stakeout police car and a taxi among others.

A more recent U.S. Pat. No. 8,365,317 issued to Maximo Dona discloses an auto cleaning toilet seat with an anal cleaning device and dryer. A combined automatic toilet self-cleaning and user hygienic system has a housing assembly, an electrical system, a liquid matter system, a turbine assembly, and a manifold assembly. The manifold assembly has at least one cut out. The manifold assembly has ducting for air to flow originating from the turbine assembly and further has a bidet for liquid matter to exit from the liquid matter system directly onto a user positioned on a toilet seat. A toilet seat has mounting brackets to mount onto the manifold assembly for rotary movement of the seat assembly. A cover assembly has a mounting frame to mount onto the manifold assembly and further a rotating arm assembly.

Notwithstanding the above, it is presently believed that there is a need and a potential commercial market for an improved toilet system in accordance with the present invention. There should be a need since the present invention contemplates an up-to-date toilet within a passenger seat that is activatable through opening and closing waste disposal and individual cleaning steps. There should be a need because the systems in accordance with the present invention are operable by push button activation switches and utilize a motor vehicles electrical system as well as a remote water tank that is hidden within the vehicle either under the seat or possibly in the trunk of the vehicle. Such toilets are operable using the motor vehicle's electrical system for positioning a privacy curtain and operating the toilet.

SUMMARY OF THE INVENTION

In essence, the present invention contemplates a push button activatable integral passenger seat and toilet system for a motor vehicle. The passenger seat and toilet system comprises or consists of the following. A passenger seat including a metal frame, a seat portion, a seat back and a console adjacent to and slightly above said seat portion and a plurality of push buttons switches disposed on an adjacent door or console for actuating a toilet system. The toilet system is integral with the passenger seat and includes a toilet bowl having a lower portion and an upper surface and an opening in a bottom of said lower portion of said bowl. A toilet seat is attached to and supported by the upper surface of the bowl.

In addition, a remote water tank contains a mass of clear water hidden in a portion of the motor vehicle as for example under the seat in a lower portion thereof or hidden in the trunk of the motor vehicle. A nozzle is disposed in the toilet bowl and a hose and electric pump disposed between an interior of the water tank and through the nozzle for pumping water from the water tank and out of the nozzle. The nozzle is constructed and dimensioned to direct a stream of water onto an anal area of an individual sitting on the toilet seat and simultaneously spraying water onto the toilet bowl for cleaning the bowl.

The toilet system also includes a waste disposal drawer, a basket and a waste disposal bag disposed below the opening in the lower portion of the toilet bowl for flushing waste and water into the bag as well as a bag closure such as a thermal or pressure paste or ribbon of paste. The bag closure typically is disposed around an upper passageway near an edge of the bag.

A seat assembly includes a removable seat cushion and an opened upwardly openable rotatable door covering the toilet bowl and separating the toilet system from the passenger compartment of a motor vehicle.

An electrical system as a part of or extension of a motor vehicles electrical system powers a circuit including the plurality of push button switches. An electric motor and gear train for rotating the door to an upwardly open position in response to pressing a first of the push button switches and closing the door in response to pressing a second of the push button switches. Separate push button switches may also be provided for dispensing fragrance and disinfectant A waste compartment is disposed below the opening in said lower portion of the toilet bowl. A suitable container such as a metal canister or basket is disposed in the waste disposal drawer and a third of the push button switches is provided for activating the electric pump to direct a stream of water from the water tank and through the nozzle to clean the individual and the toilet bowl.

The system also includes a dispenser containing a fragrance and/or disinfectant for spraying the waste compartment after cleaning the toilet bowl in response to closing a fourth of the push button switches.

Further, a fifth of the push button switches is used for closing and sealing the waste bag while a sixth of the push button switches opens the waste compartment for removal of said waste collection bag.

The invention will now be described in connection with the accompanying figures wherein like reference numbers are used to indicate like parts.

DESCRIPTION OF THE DRAWINGS

FIG. 1 is a schematic illustration of a motor vehicle including a toilet system in a passenger seat behind the driver's seat of a passenger car or the like;

DESCRIPTION OF THE PREFERRED EMBODIMENTS OF THE INVENTION

Figure 1:
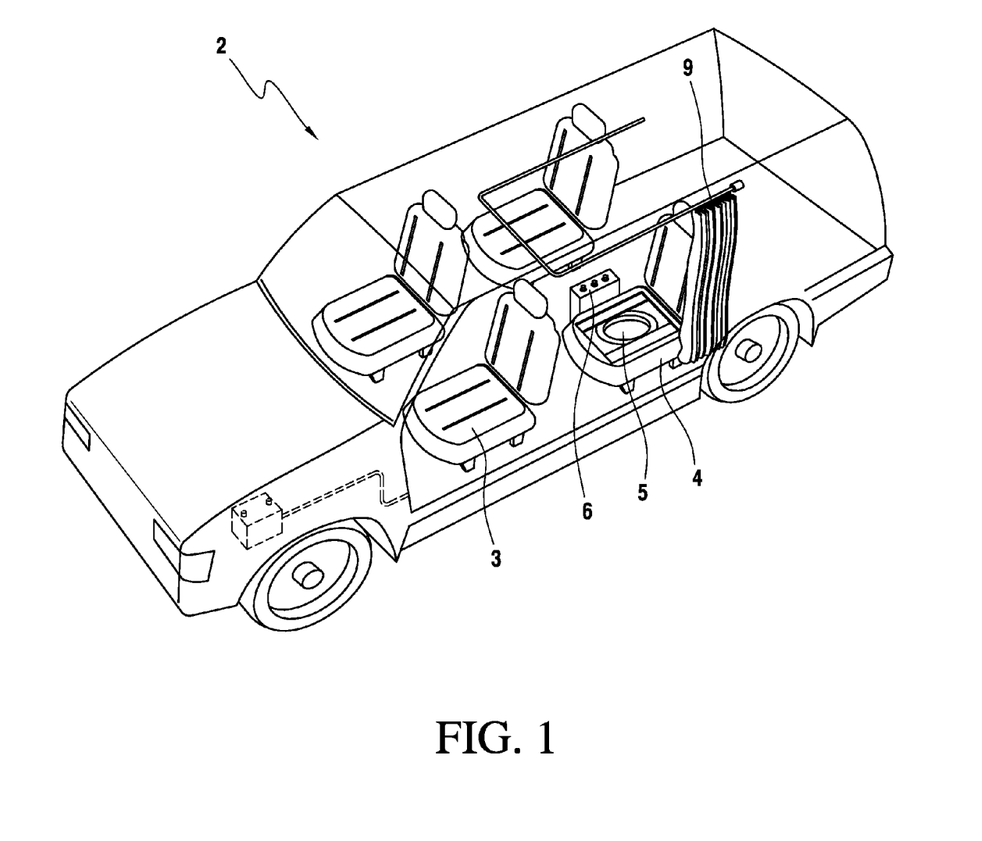

As illustrated in FIG. 1, a motor vehicle 2 such as a four seated SUV includes a driver's seat 3 and three passenger seats. As illustrated the passenger seat 4 directly behind the driver's seat 3 includes a toilet 5. An armrest or console 6 is disposed on the right side of the seat 4 and contains a plurality of push button switches to accommodate an individual using the toilet. In a preferred embodiment, the switches are disposed on a vehicle door adjacent to the toilet.

As further illustrated in FIGS. 2-6 the car seat 4 includes a conventional seat cushion 6' that is disposed above a pair of horizontally disposed sliding doors 7 and 8. When an individual wishes to use the toilet, they push a button to close a privacy screen or curtain that is moved by an electrical motor about an overhead track 9 and automatically or manually removes the seat cushion 6. It should be recognized that the seat cushion 6 may be mechanically moved and stored by an electric motor and gear mechanism in a customized installation. It is also contemplated that in a preferred embodiment of the invention the privacy curtain may be hidden from sight when not in use or stored in a separate compartment.

In a preferred embodiment of the invention the privacy screen or curtain is made of plastic with suitable decorations and recessed for storage on or near the floor of the vehicle. When the privacy screen is transferred for use, a mechanism moves the plastic screen upwardly to surround at least a lower part of the user's body such as their waist or, if desired, up to the top of the vehicle. The mechanism as well as the toilet is activated by pressing a button on an adjacent door of the vehicle.

Figure 2:
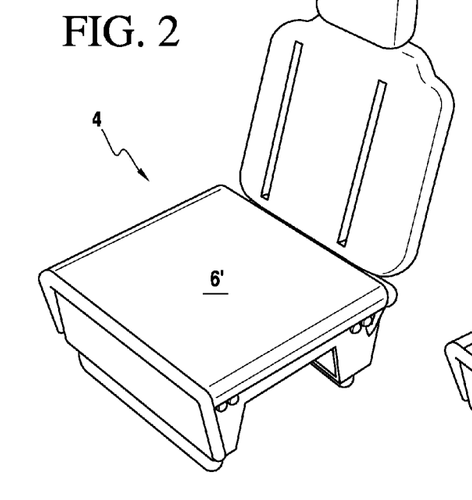
FIG. 2 is a schematic illustration of a passenger seat with a conventional seat cushion in place.

Immediately below the seat cushion 6 a pair of slidable doors 7 and 8 are opened by a separate electric motor in response to a push button switch that connects the separate motor to the motor vehicle electric system.

Figure 3:
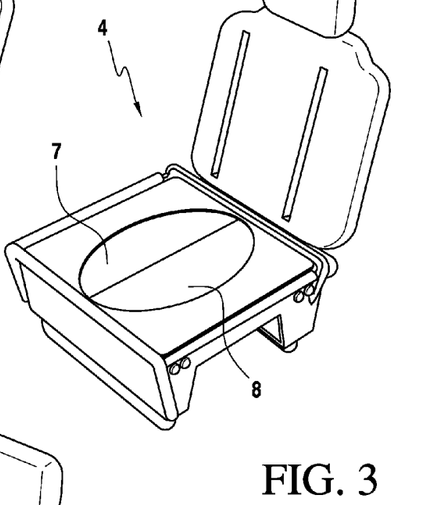
FIG. 3 is a schematic illustration of a vehicle passenger seat shown in FIG. 2 but with the conventional seat cushion removed and a pair of closeable doors and opening for a waste drawer on one side thereof.
Figure 4:
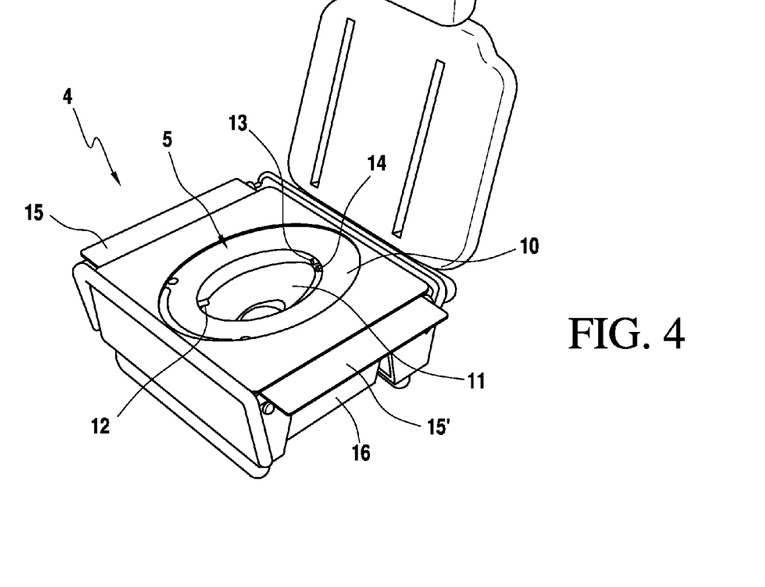
FIG. 4 is a schematic illustration of a car seat including a toilet seat as shown in FIG. 3 but showing a toilet seat, bowl, nozzles and an opening in a lower part of the bowl for waste removal.

FIG. 3 shows the passenger seat 4 including the pair of sliding doors 7 and 8 that separate the toilet 5 from the passenger compartment of the motor vehicle when closed. These doors are movable along a generally horizontal plane to an opened position when an individual desires to use the toilet 5 when the doors 7 and 8 are moved by the electric motor and gear assembly to an open portion that exposes the toilet as shown in FIG. 4. The electric motors for the privacy curtain and slidable doors may preferably be powered by the vehicle battery or a backup battery or batteries and separate chargers (not shown).

As shown in FIG. 4, a toilet seat 10 is fixed to and supported on a toilet bowl 11 and includes three nozzles 12, 13 and 14 for individuals using the toilet with the nozzle 12 in a forward part of the toilet bowl 11 that includes a waste opening 11', two nozzles 13 and 14 in a rear part of the bowl 11. The forward nozzle and one of the rear nozzles 14 are directed onto the bowl 11 for cleaning the toilet bowl while the third nozzle is directed upwardly towards an individual who is using the facility for cleaning the individual. The two or three nozzles may be operable by separate buttons.

FIG. 4 also shows a pair of pivotal doors 15, 15' with one of the doors on each side of the toilet. These doors pivot upwardly to obtain access to a waste drawer 16. As shown, the doors are partially opened by an electric motor and gear train powered by the motor vehicle's electrical system and/or battery if the engine has been turned off.

Figure 5:
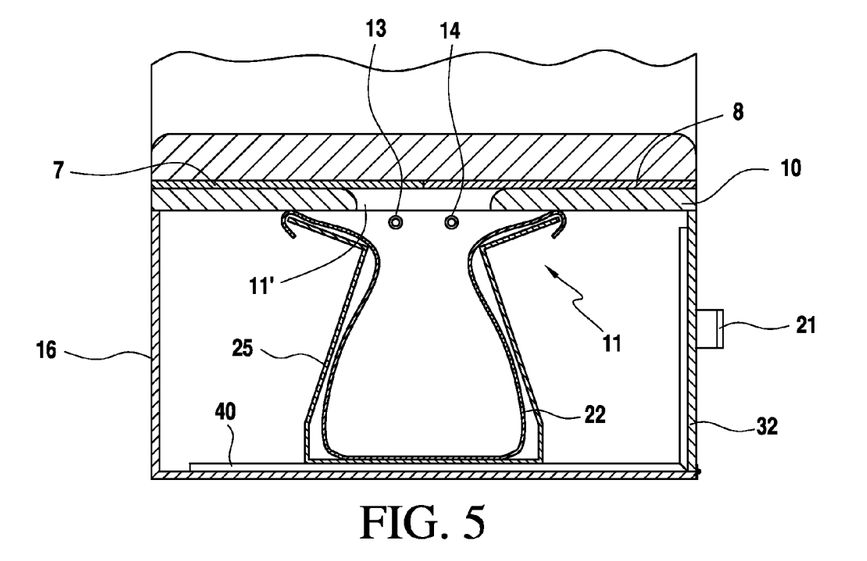
FIG. 5 is a schematic side view of a motor vehicle seat with a toilet disposed therein.

FIG. 5 is a side schematic illustration of a motor vehicle seat showing the positioning of a toilet seat, horizontally sliding doors, and cover with a conventional seat cushion in place.

Figure 6:
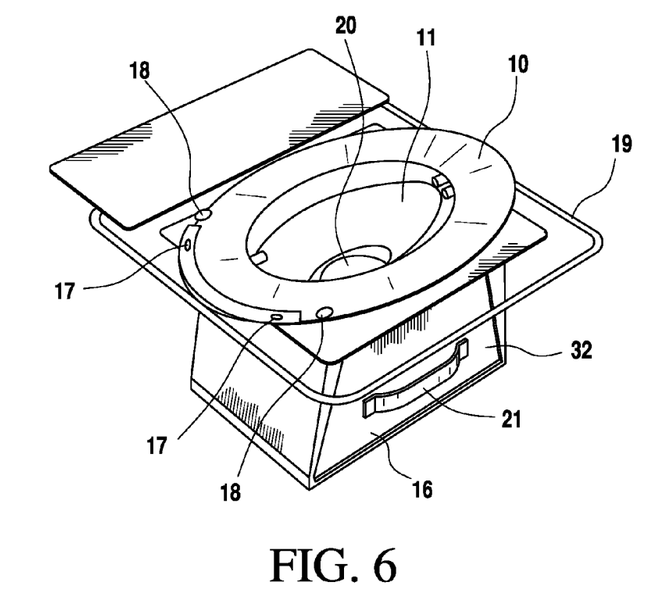
FIG. 6 is a schematic illustration of a toilet system in accordance with the present invention.

The toilet 5 as shown more clearly in FIG. 6 includes the toilet seat 10 supported on the toilet bowl 11. As shown, a nozzle such as a nozzle next to a water nozzle or a pair of vents 17 adjacent to an outer periphery of the toilet is provided for allowing an artificial fragrance to be dispensed into an interior of the motor vehicle. The perfume dispenser is preferably above the toilet seat or possible adjacent the toilet seat. In addition, a pair of small openings 18 provide for the addition of a fragrance and/or disinfectant. As shown in FIG. 6, one of the horizontally disposed sliding doors rides on tracks or rails 19 as it covers the toilet seat when in a closed position.

The waste drawer 16 is disposed or positioned below an opening 20 in the lower portion of the toilet bowl 11 and may include a handle 21 for removing the drawer or for opening a door 32 for access to a waste compartment that contains a waste basket or container 21 that includes a heavy duty plastic bag 22 (see FIG. 9). Access to the waste compartment may be electrically provided or manually opened.

Figure 7:
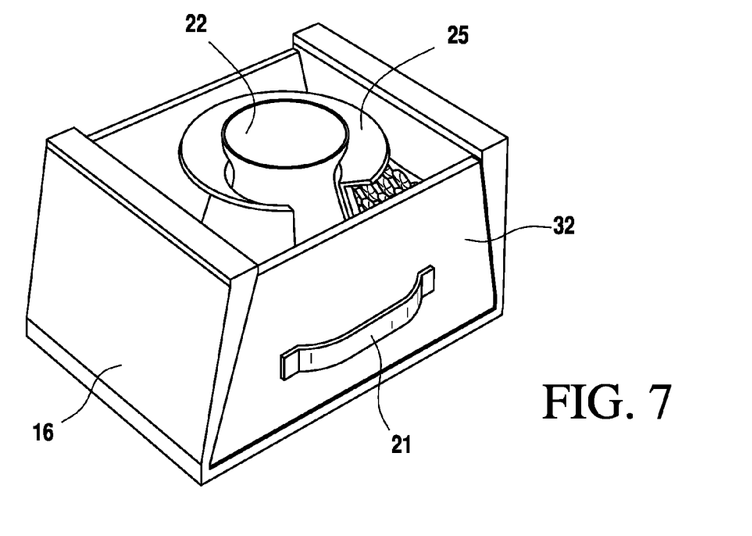
FIG. 7 is a schematic illustration of a waste drawer, waste container and bag as incorporated in the present invention.
Figure 8:
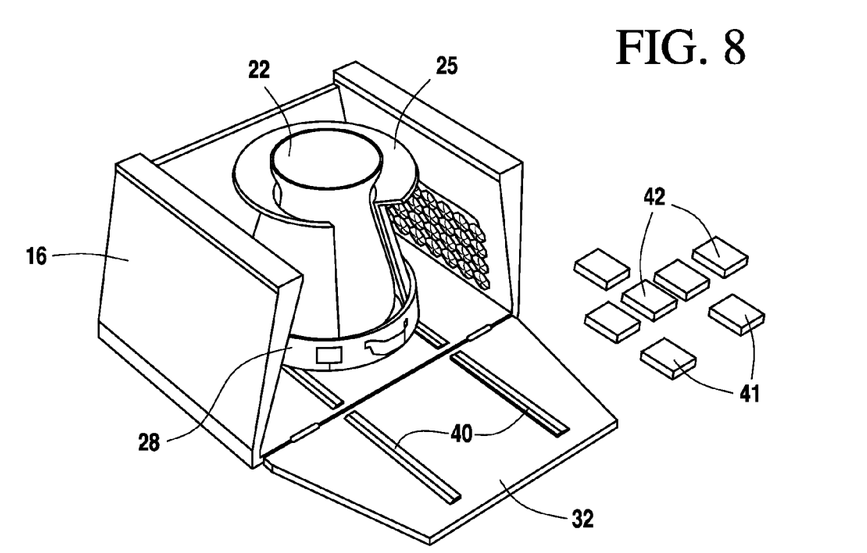
FIG. 8 is a further illustration of the waste drawer shown in FIG. 7, but with one side of the drawer folded down for access to the container and bag.
Figure 9:
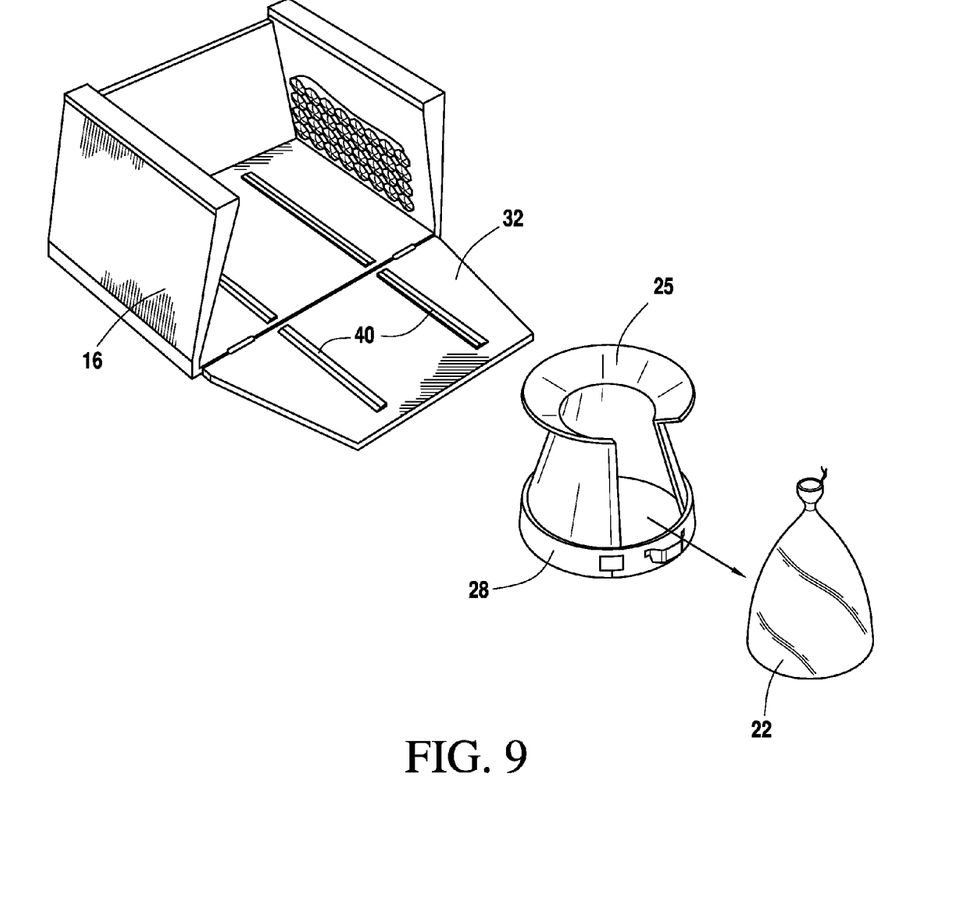
FIG. 9 is a still further illustration of the waste drawer shown in FIGS. 7 and 8 but with the waste container and bag removed from the drawer.

As illustrated in FIGS. 7, 8 and 9 the drawer 16 contains a receptacle 25 such as a basket or metal container that fits within a circular base assembly 28 or retainer that positions the receptacle below the opening 11' in the lower portion of the toilet bowl 11.

As shown in FIGS. 8 and 9, the waste receptacle 25 has the general shape of a cone with a rounded bottom portion and an outwardly extending flange portion 28 at the top of the receptacle. The heavy duty plastic bag extends over the flange portion.

In a preferred embodiment of the invention, the bottom of the waste drawer 16 and back of the drawer 32 include a pair of tracks 40 for easy removal of the receptacle from underneath the toilet bowl.

Figure 9A:
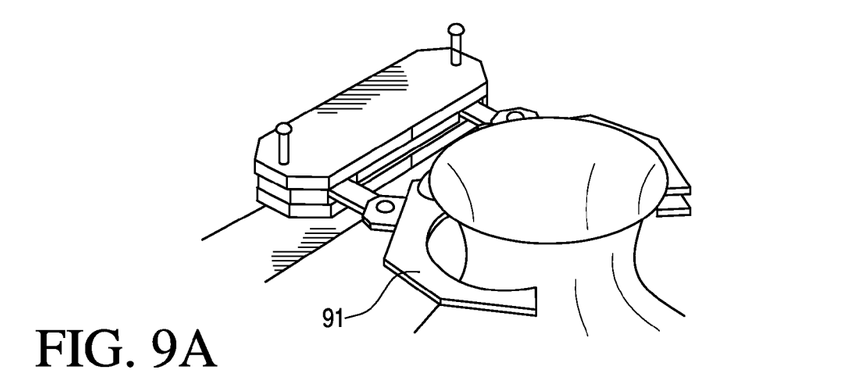
FIGS. 9A, 9B and 9C are schematic illustrations of a mechanism for temporarily closing a plastic waste bag after an initial use and before replacement of the waste bag.
Figure 9B:
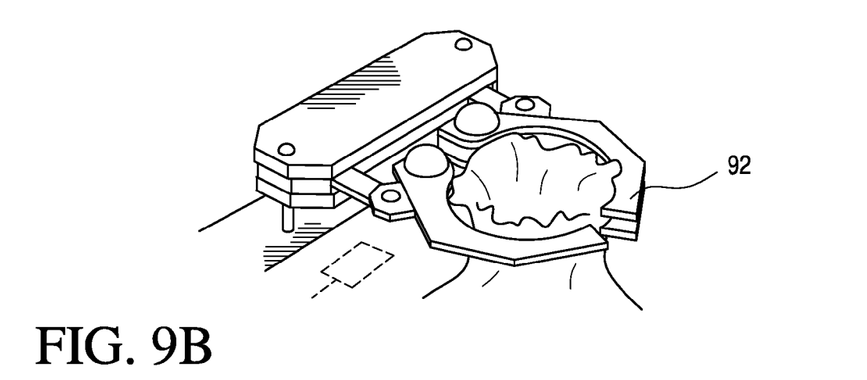
Figure 9C:
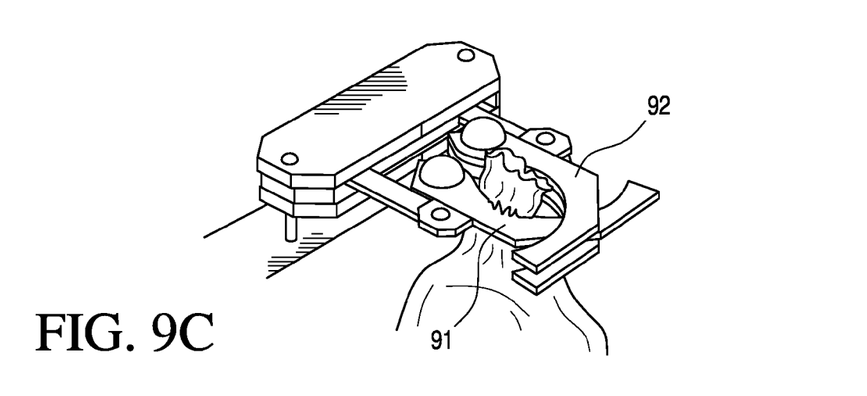
Figure 10:
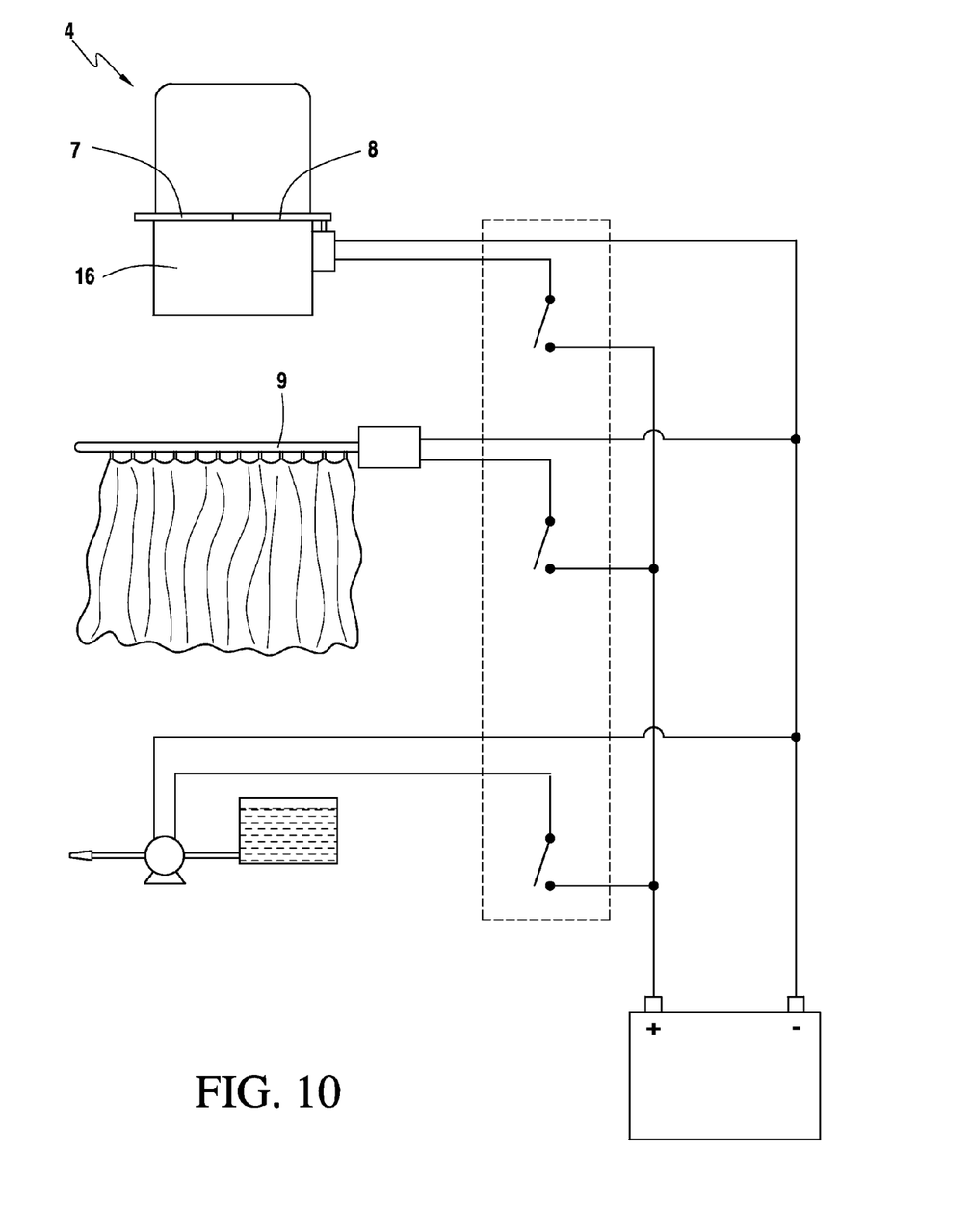
FIG. 10 is a schematic illustration of an electric circuit and switches for opening or closing the sliding doors, closing the privacy curtain and flushing the toilet.

In one embodiment of the invention, one or more manual clamps may be used to close and/or seal the waste bag. However, it is also contemplated to use a heat sealable and/or pressure sealable tape or the like around an upper portion of the waste bag that can be sealed as shown in FIGS. 9A, 9B and 9C.

As shown more clearly in FIG. 8, a number of heavy duty waste bags are stored in packages 41 on one of the side walls of waste drawer 16. In addition, a number of pairs of latex gloves 42 are stored in the waste drawer 16 for use by an individual who is removing the heavy duty plastic waste bag and insertion of a replacement bag in response to a sensor 43 that transmits a signal that indicates that a waste bag is empty or full.

Finally, each of the heavy duty plastic bags 22 include a nylon cord or the like for drawing an upper portion of the waste bag tightly together for proper disposal of waste products.

In a preferred embodiment of the invention, buttons are provided to open both the seat and the doors under the seat, a button to shut both the seat and doors at the same time and a button to push for clean water. In addition, there is a button to push for the privacy screen from the bottom of a vehicle to its top, a separate button to dispense fragrance and a separate button to dispense a disinfectant. Finally, there may be a button to play music and one to shut the waste bag through a thermal paste process. Finally, with respect to warning lights there is preferably three lights. A first green light to indicate that the bag is empty, second a blue light meaning the bag is partially filled and third a red light indicating that the bag is full.

As illustrated in FIGS. 9A, 9B and 9C a mechanism for closing a heavy duty plastic waste bag is illustrated. As shown a pair of clamps 91 and 92 are pivoted into a closed position with a single arm intermediate of an upper and lower position and of the clamp 92. In this way the waste bag may be sealed until removal of the waste bag as for example by a wire reinforced tie or the like.

In one embodiment of the invention, a first button is used to remove the seat cushion while a second button is provided for opening and closing the slidable doors. Further, a third button is used for cleaning a person and injecting a disinfectant as response to a second push. Finally, a fourth button is used for injecting fragrance into the vehicle while the fifth is used to dispose the screen for privacy. A sixth button may be provided for playing music while a seventh button is used for actuating the clamps to close the wastebasket.

A fragrance injection subsystem in the preferred embodiment may include a separate supply tank 95 as for example disposed within or adjacent a conventional type water tank 94. With respect to the eight buttons shown on the passenger door they are operably connected to control the toilet, fragrance dispenser, music etc. as powered by the vehicle electrical system or a separate battery charger (not shown).

It is also contemplated that the method of using the toilet includes a step for rinsing the waste bag to be ready for use. It is also considered that when the bag is full a lamp may be used to warn the user so that he can press the button a second time to lower the wastebasket.

Figure 11:
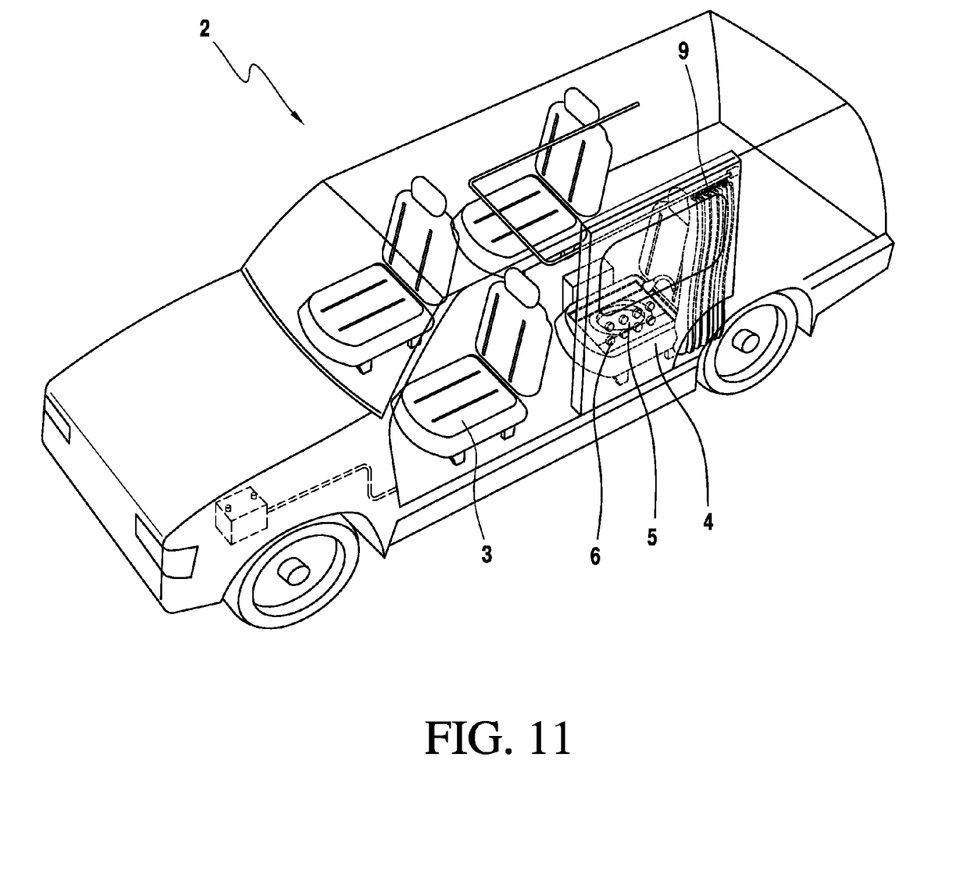
FIG. 11 illustrates a passenger door with activation buttons disposed thereon and a warning light to indicate the status of the waste bag.

As illustrated in FIG. 11, the buttons for actuating the toilet are preferably disposed in a passenger door adjacent a toilet. For example, the door in FIG. 11 includes eight buttons and a warning lamp that may show green if the bag has not reached its full level and red if it is full.

In addition to the above, a master switch may be provided preferably on the driver's door to disable or enable operation of the toilet in order to prevent a child from playing with the buttons or inadvertently pressing a button.

In one embodiment of the invention, the toilet is powered by the vehicle's electrical system including its battery and charging system. However, it is also contemplated to provide a second battery and charger as backup in the event that the vehicle electrical system is not working or shut down. In a preferred embodiment, the first battery activates the entire toilet while both batteries are charged by an alternator or the like in the vehicle's electrical system.

While the invention has been described in connection with its accompanying drawing, it should be recognized that changes and modifications may be made therein without departing from the scope of the appended claims.

What is claimed is:

1. A push button activatable integral passenger seat and toilet system for a motor vehicle, said passenger seat and toilet system consisting of:
    a passenger seat including a metal frame, a seat portion, a seat back and a console or armrest adjacent and above said seat portion, and a plurality of push button switches disposed in said console for activating a toilet system;
    a privacy screen disposed on a floor of the vehicle and extendable upwardly on a track;
    a first of said push button switches, a first electrical motor and a first drive train for moving said privacy screen around said seat in response to closing said first of said push button switches;
    a toilet system integral with said passenger seat and including a toilet bowl having a lower portion and an upper surface and an opening in a bottom of said lower portion of said bowl;
    a toilet seat attached to and supported by said upper surface of said bowl;
    a remote water tank containing a mass of clean water hidden in a portion of the motor vehicle and independent of a cooling system for the motor vehicle, a nozzle disposed in said toilet bowl and a hose and an electric pump disposed between an interior of said water tank and through said nozzle for pumping water from said water tank and out of said nozzles; and
    wherein said nozzle is constructed and dimensioned to direct a stream of water onto an anal area of an individual sitting on said toilet seat and simultaneously onto said toilet bowl for cleaning said bowl;
    a waste disposal drawer, a container and a heavy duty waste disposal bag disposed below said opening in said lower portion of said toilet bowl for flushing waste and water into said bag and a cord for closing said bag;
    a removable seat cushion and an openable rotatable door covering said toilet bowl and closing said toilet bowl from a passenger compartment in a motor vehicle;
    an electrical system as a part of a motor vehicle for powering a circuit which includes said plurality of push button switches;
    a second electrical motor and second gear train for rotating said door to an open position in response to closing a second of said push button switches and closing said door in response to closing a third of said push button switches;
    a waste compartment below said opening in said lower portion of said toilet bowl, said container disposed below said opening to remove waste and water from said toilet bowl;
    a fourth of said push button switches for activating said electric pump to direct a stream of water from said water tank and through said nozzles to clean the individual and toilet bowl;

a dispenser containing a fragrance and disinfectant for spraying said waste compartment after cleaning the toilet bowl in response to closing a fifth of said push button switches;

a sixth of said push button switches closing and sealing said heavy duty waste bag;

a seventh of said push button switches for opening said waste compartment for removal of said closed and sealed waste collection bag; and an eighth of said switches and said first electric motor for moving said privacy screen to an open and storage position.

2. A push button activatable integral passenger seat and toilet system for a motor vehicle, said passenger seat and toilet system consisting of:

a passenger seat including a metal frame, a seat portion, a seat back and a console or armrest adjacent and above said seat portion, and a plurality of push button switches disposed in said console for activating a toilet system;

a privacy screen disposed on a floor of the vehicle and extendable upwardly on a track:

a first of said push button switches, a first electrical motor and a first drive train for moving said privacy screen around said seat in response to closing said first of said push button switches;

a toilet system integral with said passenger seat and including a toilet bowl having a lower portion and an upper surface and an opening in a bottom of said lower portion of said bowl;

a toilet seat attached to and supported by said upper surface of said bowl;

a remote water tank containing a mass of clean water hidden in a portion of the motor vehicle and independent of a cooling system for the motor vehicle, a nozzle disposed in said toilet bowl and a hose and an electric pump disposed between an interior of said water tank and through said nozzle for pumping water from said water tank and out of said nozzles; and wherein said nozzle is constructed and dimensioned to direct a stream of water onto an anal area of an individual sitting on said toilet seat and simultaneously onto said toilet bowl for cleaning said bowl;

a waste disposal drawer, a container and a heavy duty waste disposal bag disposed below said opening in said lower portion of said toilet bowl for flushing waste and water into said bag and a cord for closing said bag;

a removable seat cushion and an openable rotatable door covering said toilet bowl and closing said toilet bowl from a passenger compartment in a motor vehicle;

an electrical system as a part of a motor vehicle for powering a circuit which includes said plurality of push button switches;

a second electrical motor and second gear train for rotating said door to an open position in response to closing a second of said push button switches and closing said door in response to closing a third of said push button switches;

a waste compartment below said opening in said lower portion of said toilet bowl, said container disposed below said opening to remove waste and water from said toilet bowl;

a fourth of said push button switches for activating said electric pump to direct a stream of water from said water tank and through said nozzles to clean the individual and toilet bowl;

a dispenser containing a fragrance and disinfectant for spraying said waste compartment after cleaning the toilet bowl in response to closing a fifth of said push button switches;

a sixth of said push button switches closing and sealing said heavy duty waste bag;

a seventh of said push button switches for opening said waste compartment for removal of said closed and sealed waste collection bag; and an eighth of said switches and said first electric motor for moving said privacy screen to an open and storage position, and a cord extending around said bag through a passageway passing around an upper portion thereof or closing and sealing said bag.

3. A push button activatable integral passenger seat and toilet system for a motor vehicle, said passenger seat and toilet system consisting of:

a passenger seat including a metal frame, a seat portion, a seat back and a console or armrest adjacent and above said seat portion, and a plurality of push button switches disposed in said console for activating a toilet system;

a privacy screen disposed on a floor of the vehicle and extendable upwardly on a track:

a first of said push button switches, a first electrical motor and a first drive train for moving said privacy screen around said seat in response to closing said first of said push button switches;

a toilet system integral with said passenger seat and including a toilet bowl having a lower portion and an upper surface and an opening in a bottom of said lower portion of said bowl;

a toilet seat attached to and supported by said upper surface of said bowl;

a remote water tank containing a mass of clean water hidden in a portion of the motor vehicle and independent of a cooling system for the motor vehicle, a nozzle disposed in said toilet bowl and a hose and an electric pump disposed between an interior of said water tank and through said nozzle for pumping water from said water tank and out of said nozzles; and wherein said nozzle is constructed and dimensioned to direct a stream of water onto an anal area of an individual sitting on said toilet seat and simultaneously onto said toilet bowl for cleaning said bowl;

a waste disposal drawer, a container and a heavy duty waste disposal bag disposed below said opening in said lower portion of said toilet bowl for flushing waste and water into said bag and a cord for closing said bag;

a removable seat cushion and an openable rotatable door covering said toilet bowl and closing said toilet bowl from a passenger compartment in a motor vehicle;

an electrical system as a part of a motor vehicle for powering a circuit which includes said plurality of push button switches;

a second electrical motor and second gear train for rotating said door to an open position in response to closing a second of said push button switches and closing said door in response to closing a third of said push button switches;

a waste compartment below said opening in said lower portion of said toilet bowl, said container disposed below said opening to remove waste and water from said toilet bowl;

a fourth of said push button switches for activating said electric pump to direct a stream of water from said water tank and through said nozzles to clean the individual and toilet bowl;

a dispenser containing a fragrance and disinfectant for spraying said waste compartment after cleaning the toilet bowl in response to closing a fifth of said push button switches;

a sixth of said push button switches closing and sealing said heavy duty waste bag;

a seventh of said push button switches for opening said waste compartment for removal of said closed and sealed waste collection bag; and an eighth of said switches and said first electric motor for moving said privacy screen to an open and storage position, and a track way and glove container with a supply of waste container bags and Latex gloves.

4. A push button activatable integral passenger seat and toilet system for a motor vehicle, said passenger seat and toilet system consisting of:

a passenger seat including a metal frame, a seat portion, a seat back and a console or armrest adjacent and above said seat portion, and a plurality of push button switches disposed in said console for activating a toilet system;

a privacy screen disposed on a floor of the vehicle and extendable upwardly on a track;

a first of said push button switches, a first electrical motor and a first drive train for moving said privacy screen around said seat in response to closing said first of said push button switches;

a toilet system integral with said passenger seat and including a toilet bowl having a lower portion and an upper surface and an opening in a bottom of said lower portion of said bowl;

a toilet seat attached to and supported by said upper surface of said bowl;

a remote water tank containing a mass of clean water hidden in a portion of the motor vehicle and independent of a cooling system for the motor vehicle, a nozzle disposed in said toilet bowl and a hose and an electric pump disposed between an interior of said water tank and through said nozzle for pumping water from said water tank and out of said nozzles; and wherein said nozzle is constructed and dimensioned to direct a stream of water onto an anal area of an individual sitting on said toilet seat and simultaneously onto said toilet bowl for cleaning said bowl;

a waste disposal drawer, a container and a heavy duty waste disposal bag disposed below said opening in said lower portion of said toilet bowl for flushing waste and water into said bag and a cord for closing said bag;

a removable seat cushion and an openable rotatable door covering said toilet bowl and closing said toilet bowl from a passenger compartment in a motor vehicle;

an electrical system as a part of a motor vehicle for powering a circuit which includes said plurality of push button switches;

a second electrical motor and second gear train for rotating said door to an open position in response to closing a second of said push button switches and closing said door in response to closing a third of said push button switches;

a waste compartment below said opening in said lower portion of said toilet bowl, said container disposed below said opening to remove waste and water from said toilet bowl;

a fourth of said push button switches for activating said electric pump to direct a stream of water from said water tank and through said nozzles to clean the individual and toilet bowl;

a dispenser containing a fragrance and disinfectant for spraying said waste compartment after cleaning the toilet bowl in response to closing a fifth of said push button switches;

a sixth of said push button switches closing and sealing said heavy duty waste bag;

a seventh of said push button switches for opening said waste compartment for removal of said closed and sealed waste collection bag; and an eighth of said switches and said first electric motor for moving said privacy screen to an open and storage position, and a source of lights and music operable by a ninth and tenth push button switches.

* * * * *